US012668134B2

(12) United States Patent
Hendrickson et al.

(10) Patent No.: US 12,668,134 B2
(45) Date of Patent: Jun. 30, 2026

(54) SYSTEM FOR MANAGING VEHICLE POWER OUTLET AND ESTIMATING RANGE

(71) Applicant: FORD GLOBAL TECHNOLOGIES, LLC, Dearborn, MI (US)

(72) Inventors: Anna Frances Hardig Hendrickson, Southfield, MI (US); Ryan Wayne Warner, Ann Arbor, MI (US); Clayton Benjamin Ford, Dearborn, MI (US); Andrew Peter Attivissimo, Allen Park, MI (US); Emad Khan, Acworth, GA (US); Jacob Michael Haspiel, Ann Arbor, MI (US); Joseph Ian Halaszynski, Farmington Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 359 days.

(21) Appl. No.: 18/074,735

(22) Filed: Dec. 5, 2022

(65) Prior Publication Data

US 2024/0181897 A1 Jun. 6, 2024

(51) Int. Cl.
| | |
|---|---|
| *B60L 15/20* | (2006.01) |
| *B60L 1/00* | (2006.01) |
| *B60L 50/60* | (2019.01) |
| *B60W 60/00* | (2020.01) |

(52) U.S. Cl.
CPC ........... *B60L 15/2045* (2013.01); *B60L 1/006* (2013.01); *B60L 50/60* (2019.02); *B60W 60/00253* (2020.02); *B60L 2240/66* (2013.01); *B60W 2555/20* (2020.02); *B60W 2556/45* (2020.02); *B60W 2710/242* (2013.01)

(58) Field of Classification Search
CPC ...... B60L 15/20; B60L 15/2045; B60L 50/60; B60L 1/006; B60L 2240/66; B60W 60/00253; B60W 2556/45; B60W 2555/20; G08G 1/0137; G08G 1/0112
USPC ..................................................... 701/22, 119
See application file for complete search history.

(56) References Cited

U.S. PATENT DOCUMENTS

| | | | | |
|---|---|---|---|---|
| 9,079,507 | B2* | 7/2015 | Smith | B60L 50/66 |
| 9,308,878 | B2* | 4/2016 | McKee | B60R 16/027 |
| 9,476,719 | B2 | 10/2016 | Meyer et al. | |
| 9,776,643 | B2 | 10/2017 | Skaff et al. | |
| 10,048,082 | B2* | 8/2018 | Meyer | G01C 21/3469 |
| 10,281,296 | B2 | 5/2019 | MacNeille et al. | |
| 11,067,403 | B2* | 7/2021 | Lindemann | B60W 50/0098 |
| 12,090,872 | B2* | 9/2024 | Woods | H02J 7/342 |
| 12,208,691 | B2* | 1/2025 | Diamond | B60L 1/06 |

(Continued)

FOREIGN PATENT DOCUMENTS

| | | |
|---|---|---|
| CN | 106989752 A | 7/2017 |
| CN | 107270918 A | 10/2017 |

(Continued)

*Primary Examiner* — Andrew Joseph Rudy
(74) *Attorney, Agent, or Firm* — David B. Kelley; Brooks Kushman P.C.

(57) ABSTRACT

A vehicle includes an electric motor that propels the vehicle, a battery that provides power to the electric motor, one or more power outlets that supply electric power from the battery to one or more external devices, and one or more controllers that, responsive to indication that a driving range is less than a threshold, disable one of the power outlets.

6 Claims, 3 Drawing Sheets

(56) References Cited

U.S. PATENT DOCUMENTS

| | | | |
|---|---|---|---|
| 12,235,326 B2 * | 2/2025 | Stevo | H02J 7/007188 |
| 2010/0138142 A1 | 6/2010 | Pease | |
| 2010/0256846 A1 | 10/2010 | Shaffer | |
| 2016/0196756 A1 | 7/2016 | Prakash et al. | |
| 2017/0074677 A1 | 3/2017 | MacNeille et al. | |
| 2017/0176195 A1 | 6/2017 | Rajagopalan et al. | |
| 2019/0107406 A1 | 4/2019 | Cox et al. | |
| 2020/0346769 A1 | 11/2020 | Knapp et al. | |
| 2021/0203177 A1 | 7/2021 | Peng | |
| 2022/0057227 A1 | 2/2022 | Koenig et al. | |
| 2022/0266704 A1 * | 8/2022 | Kobayashi | B60L 53/16 |

FOREIGN PATENT DOCUMENTS

| | | | |
|---|---|---|---|
| EP | 2596977 A1 | 5/2013 | |
| WO | 2020106169 A2 | 5/2020 | |

* cited by examiner

200

*300*

SYSTEM FOR MANAGING VEHICLE POWER OUTLET AND ESTIMATING RANGE

TECHNICAL FIELD

The present disclosure relates to managing power outlets and estimating vehicle range.

BACKGROUND

Electric vehicles (EVs) rely on a traction battery for storing electric energy that is used for various purposes including vehicle propulsion and power supply to various devices. A remaining driving range (distance to empty or DTE) of the vehicles may be calculated using the state of charge (SOC) of the traction battery. In addition, an increased vehicle weight contributed by external devices carried by the vehicles may also affect the driving range.

SUMMARY

A vehicle includes an electric motor that propels the vehicle, a battery that provides power to the electric motor, one or more power outlets that supply electric power from the battery to one or more external devices, and one or more controllers that, responsive to indication that a driving range is less than a threshold, disable one of the power outlets.

A method includes, while a driving range of a vehicle is less than a threshold, preventing power flow from a traction battery of the vehicle to a power outlet of the vehicle, and responsive to the driving range exceeding the threshold, enabling power flow from the traction battery to the power outlet.

A vehicle power system includes a traction battery, a power outlet, and one or more controllers that enable and disable power flow from the traction battery to the power outlet based on an amount of electric charge stored by the traction battery.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The present disclosure, among other things, proposes a vehicle system for managing a vehicle energy portfolio and estimating a driving range.

Figure 1:
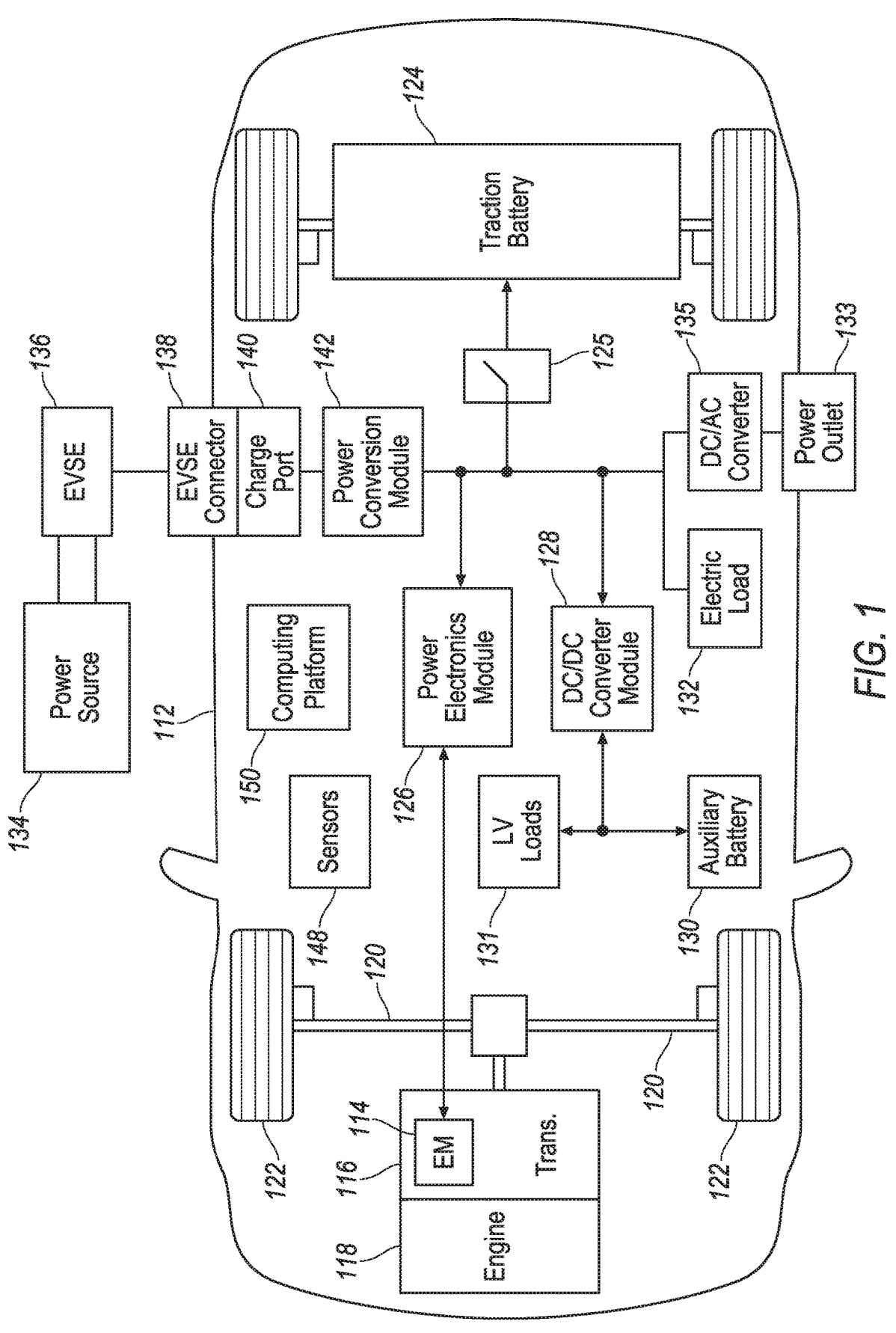
FIG. 1 illustrates an example block topology of an electrified vehicle illustrating drivetrain and energy storage components.

FIG. 1 depicts an electrified vehicle 112 that may be referred to as a plug-in hybrid-electric vehicle (PHEV), a battery electric vehicle (BEV), a mild hybrid-electric vehicle (MHEV), and/or a full hybrid electric vehicle (FHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and braking capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. The engine 118 may also act as a generator and generate electric power to supply to the electric machine 114 and/or the traction battery 124. Additionally or alternatively, the vehicle 112 may be provided with an external power generating device. For instance, the external power generating device may convert conventional fuel (e.g. gasoline, propane) into electric power. Alternatively, the external power generating device may include one or more green energy sources (e.g. a solar panel, wind turbine) or the like.

A traction battery or battery pack 124 may store energy that can be used by the electric machines 114. The vehicle battery pack 124 may provide a high voltage direct current (DC) output. The traction battery 124 may be electrically coupled to one or more power electronics modules 126 (such as a traction inverter). One or more contactors 125 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to DC voltage compatible with the traction battery 124.

The vehicle 112 may include a variable-voltage converter (VVC) (not shown) electrically coupled between the traction battery 124 and the power electronics module 126. The VVC may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems has one or more low-voltage loads 131 that may be electrically coupled to the auxiliary battery 130. The low-voltage loads 131 may include one or more components integrated with the vehicle 112. Additionally or alternatively, the low-voltage loads 131 may include one or more external components/devices electrically connected to the auxiliary battery via one or more wired (e.g. universal serial bus (USB)) or wireless connectors (e.g. wireless charger).

One or more electrical loads 132 may be coupled to the high-voltage bus/rail. The electrical loads 132 may have an associated controller that operates and controls the electrical loads 132 when appropriate. Examples of electrical loads 132 may be a fan, an electric heating element, and/or an air-conditioning compressor. The vehicle 112 may be further configured to provide electric power supply to an external power device (not shown) via one or more power outlets (power sockets) 133 through a DC/AC converter 135. The power outlet 133 may be located inside and/or outside the vehicle cabin. For instance, the power outlet 133 may be receptacles configured to correspond to NEMA connectors used in North America, although power receptacles supporting other standards may be used under essentially the same concept. The DC/AC converter 135 may be electrically coupled between the traction battery 124 and the power outlet 133 and configured to convert the high voltage DC current from the traction battery 124 into an AC current with a corresponding voltage (e.g. 110V, 220V or the like) compatible with the external power devices. The power outlet 133 may be further configured to operate as a power inlet port connected to the external power generating device to charge the battery 124.

The electrified vehicle 112 may be configured to recharge the traction battery 124 from an external power source 134. The external power source 134 may be a connection to an electrical outlet. The external power source 134 may be electrically coupled to a charger or electric vehicle supply equipment (EVSE) 136. The external power source 134 may be an electrical power distribution network or grid as provided by an electric utility company. The EVSE 136 may provide circuitry and controls to regulate and manage the transfer of energy between the power source 134 and the vehicle 112. The external power source 134 may provide DC or AC electric power to the EVSE 136. The EVSE 136 may have a charge connector 138 for plugging into a charge port 140 of the vehicle 112. The charge port 140 may be any type of port configured to transfer power from the EVSE 136 to the vehicle 112. The charge port 140 may be electrically coupled to a charger or on-board power conversion module 142. The power conversion module 142 may condition the power supplied from the EVSE 136 to provide the proper voltage and current levels to the traction battery 124. The power conversion module 142 may interface with the EVSE 136 to coordinate the delivery of power to the vehicle 112. The EVSE connector 138 may have pins that mate with corresponding recesses of the charge port 140. Alternatively, various components described as being electrically coupled or connected may transfer power using a wireless inductive coupling.

The vehicle 112 may be provided with various sensors 148 to perform various measurements. As a few non-limiting examples, the sensors 148 may include an electric power sensor in communication with the power outlet 133 configured to detect the type of the external power devices connected to the power outlet 133. The sensors 148 may further include a vehicle weight sensor configured to measure the weight of the vehicle 112. The sensor data may be transmitted to a controller or computing platform 150 for processing and analysis.

Figure 2:
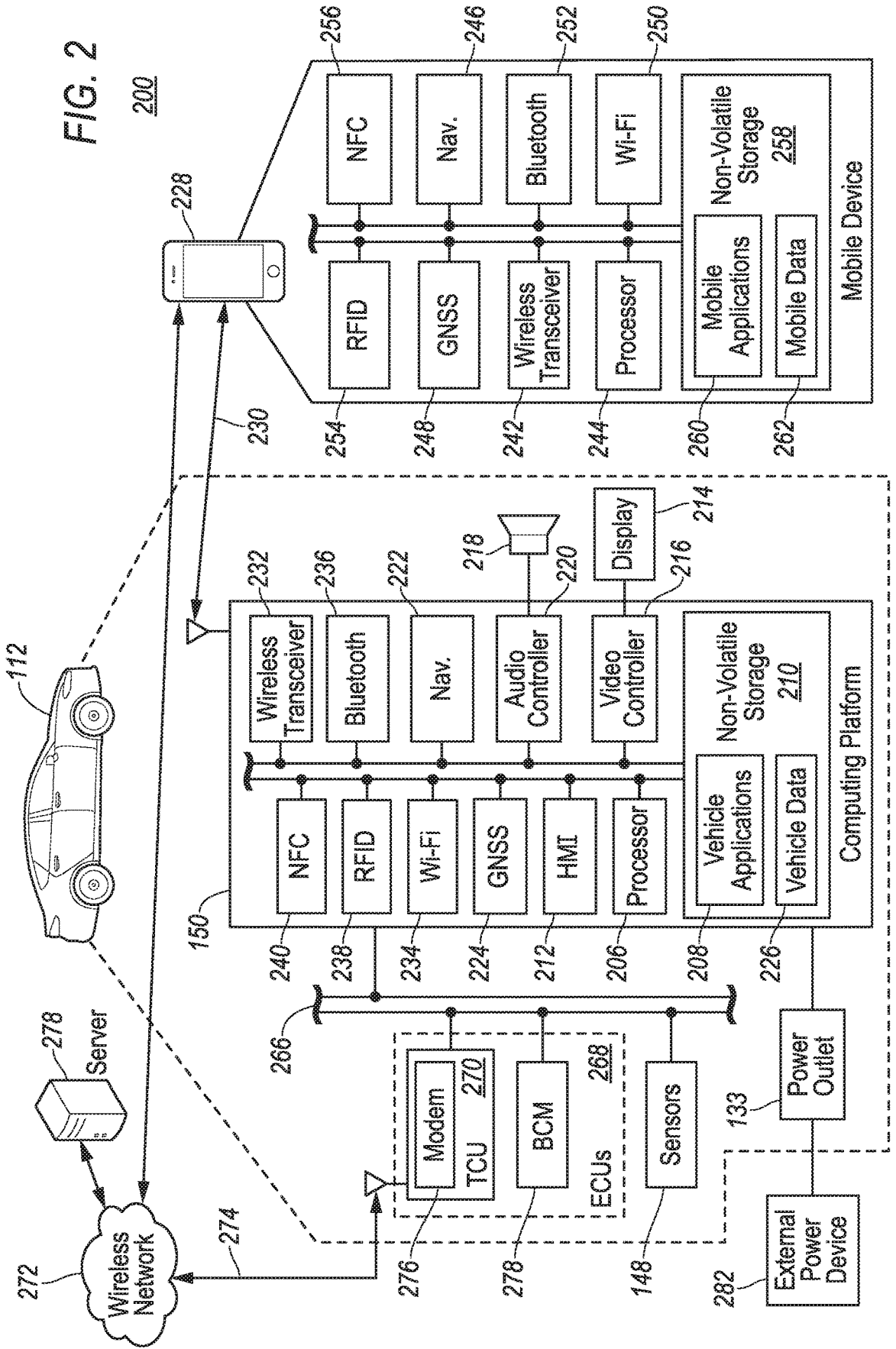
FIG. 2 illustrates an example diagram of a system controller and a battery electric control module.

Referring to FIG. 2, an example block topology of a vehicle system 200 of one embodiment of the present disclosure is illustrated. It should be noted that the illustrated system 200 is merely an example, and more, fewer, and/or differently located elements may be used.

As illustrated in FIG. 2, the computing platform 150 may include one or more processors 206 configured to perform instructions, commands, and other routines in support of the processes described herein. For instance, the computing platform 150 may be configured to execute instructions of vehicle applications 208 to provide features such as navigation, remote controls, and wireless communications. Such instructions and other data may be maintained in a non-volatile manner using a variety of types of computer-readable storage medium 210. The computer-readable medium 210 (also referred to as a processor-readable medium or storage) includes any non-transitory medium (e.g., tangible medium) that participates in providing instructions or other data that may be read by the processor 206 of the computing platform 150. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and SQL.

The computing platform 150 may be provided with various features allowing the vehicle occupants/users to interface with the computing platform 150. For example, the computing platform 150 may receive input from HMI controls 212 configured to provide for occupant interaction with the vehicle 112. As an example, the computing platform 150 may interface with one or more buttons, switches, knobs, or other HMI controls configured to invoke functions on the computing platform 150 (e.g., steering wheel audio buttons, a push-to-talk button, instrument panel controls, etc.).

The computing platform 150 may also drive or otherwise communicate with one or more displays 214 configured to provide visual output to vehicle occupants by way of a video controller 216. In some cases, the display 214 may be a touch screen further configured to receive user touch input via the video controller 216, while in other cases the display 214 may be a display only, without touch input capabilities. The computing platform 150 may also drive or otherwise communicate with one or more speakers 218 configured to provide audio output and input to vehicle occupants by way of an audio controller 220.

The computing platform 150 may also be provided with navigation and route planning features through a navigation controller 222 configured to calculate navigation routes responsive to user input via, for example, the HMI controls 212, and output planned routes and instructions via the speaker 218 and the display 214. Location data that is needed for navigation may be collected from a global navigation satellite system (GNSS) controller 224 configured to communicate with multiple satellites and calculate the location of the vehicle 112. The GNSS controller 224 may be configured to support various current and/or future global or regional location systems such as global positioning system (GPS), Galileo, Beidou, Global Navigation Satellite System (GLONASS) and the like. Map data used for route planning may be stored in the storage 210 as a part of the vehicle data 226. Navigation software may be stored in the storage 210 as one of the vehicle applications 208.

The computing platform 150 may be configured to wirelessly communicate with a mobile device 228 of the vehicle users/occupants via a wireless connection 230. The mobile device 228 may be any of various types of portable computing devices, such as cellular phones, tablet computers, wearable devices, smart watches, smart fobs, laptop computers, portable music players, or other devices capable of communication with the computing platform 150. A wireless transceiver 232 may be in communication with a Wi-Fi controller 234, a Bluetooth controller 236, a radio-frequency identification (RFID) controller 238, a near-field communication (NFC) controller 240, and other controllers such as a Zigbee transceiver, an IrDA transceiver, an ultra-wide band (UWB) controller (not shown), and be configured to communicate with a compatible wireless transceiver 242 of the mobile device 228.

The mobile device 228 may be provided with a processor 244 configured to perform instructions, commands, and other routines in support of the processes such as navigation, telephone, wireless communication, and multi-media processing. For instance, the mobile device 228 may be provided with location and navigation functions via a navigation controller 246 and a GNSS controller 248. The mobile device 228 may be provided with the wireless transceiver 242 in communication with a Wi-Fi controller 250, a Bluetooth controller 252, a RFID controller 254, an NFC controller 256, and other controllers (not shown), configured to communicate with the wireless transceiver 232 of the computing platform 150. The mobile device 228 may be further provided with a non-volatile storage 258 to store various mobile application 260 and mobile data 262.

The computing platform 150 may be further configured to communicate with various components of the vehicle 112 via one or more in-vehicle networks 266. The in-vehicle network 266 may include, but is not limited to, one or more of a controller area network (CAN), an Ethernet network, and a media-oriented system transport (MOST), as some examples. Furthermore, the in-vehicle network 266, or portions of the in-vehicle network 266, may be a wireless network accomplished via Bluetooth low-energy (BLE), Wi-Fi, UWB, or the like.

The computing platform 150 may be configured to communicate with various electronic control units (ECUs) 268 of the vehicle 112 configured to perform various operations. For instance, the ECUs 268 may include a telematics control unit (TCU) 270 configured to control telecommunication between the vehicle 112 and a wireless network 272 through a wireless connection 274 using a modem 276. The wireless connection 274 may be in the form of various communication networks, for example, a cellular network. Through the wireless network 272, the vehicle may access one or more servers 278 to access various content for various purposes. It is noted that the terms wireless network and server are used as general terms in the present disclosure and may include any computing network involving carriers, routers, computers, controllers, circuitry or the like configured to store data and perform data processing functions and facilitate communication between various entities.

The ECUs 268 may further include a body control module (BCM) 278 configured to operate various body features of the vehicle 112. For instance, the BCM 278 may be configured to monitor and control the operation of the electric load 132 as well as the power outlet 133 that is configured to supply electric power to one or more external power devices 282. As illustrated in the example with reference to FIG. 2, the line connecting the power outlet 133 and the external power device 282 may represent one or more plugs. The external power devices 282 are used as a general term in the present disclosure and may include various devices, apparatuses, and hardware powered by electricity. As a few non-limiting examples, the external power devices 282 may include one or more appliance (e.g. television, refrigerator, cooking stove or the like), power tools, electric lights, power camping equipment or the like each having a power rating. Additionally, the external power devices 282 may further include the external power generating devices to charge the traction battery 124 discussed above. The sensors 148 may be configured to detect the type and power rating of the external power devices 282 and report the detected information to the computing platform 150 and BCM 278. Combined with the information indicative of the status of the battery 124 such as the temperature and SOC, the computing platform 150 may determine and predict the driving range of the vehicle 112. The external power devices 282 may be further provided with wireless communication capabilities configured to communicate with the wireless transceiver 232 of the computing platform 150. For instance, the external power devices 282 may be provided with an RFID controller (not shown) in short-range communication with the computing platform 150 regarding the status of the devices. The computing platform 150 may detect the presence or absence of one or more of the external power devices 282 based on the short-range wireless communication.

Figure 3:
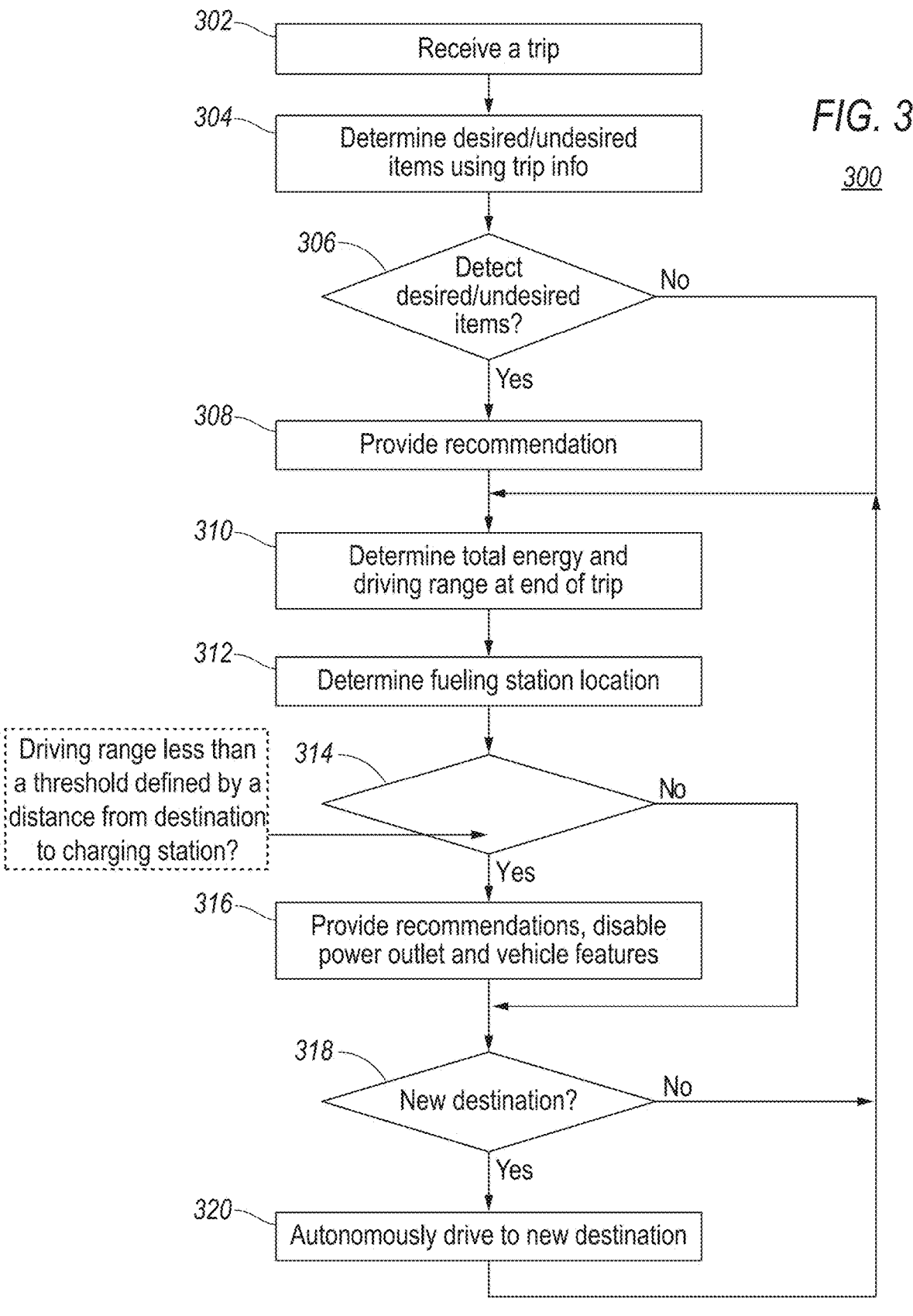
FIG. 3 illustrates an example flow diagram of a vehicle power management process.

In the present disclosure, the power outlet 133 may include a plurality of power outlet ports individually or collectively controlled by the BCM 278 and or the computing platform 150. Therefore, the vehicle 112 may individually turn on and off each of the power outlet ports as a part of the vehicle energy management scheme. Referring to FIG. 3, an example flow diagram of a power management process of one embodiment of the present disclosure is illustrated. With continuing reference to FIGS. 1 and 2, the process 300 may be individually or collectively performed via the computing platform 150 and/or one or more of the ECUs 268. For simplicity, the following description will be made with reference to the computing platform 150. In response to receiving a planned trip information at operation 302, the computing platform 150 determines desired and undesired items using the trip information at operation 304. The trip information may include data entries indicating various aspects of the trip. For instance, the trip information may include the time duration, and destination locations of the trip (e.g. camping sites). The trip information may be received from the mobile device 228 and or the server 278 as a user calendar schedule. Additionally or alternatively, the trip information may be manually input to the computing platform 150 via the HMI controls 212 (e.g. as a navigation destination). With the trip information received, the computing platform 150 may be able to determine desired and undesired items associated with the trip. For instance, if the trip location is in the mountain, an e-scooter designed for cities streets may be undesired because the user may not be able to use it at the destination location. Instead, a mountain bike designed for mountain terrains may be desired. The computing platform 150 may further determine the desired and undesired items using the weather condition corresponding to the destination locations and trip duration received from the server 278. For instance, responsive to sunny weather, the computing platform 150 may recommend bringing a portable solar panel to generate electric charge when the vehicle 112 is parked. If the weather is rainy, the desired item may further include raincoats or umbrellas. At operation 306, the computing platform 150 verifies the presence and absence of the items within the vehicle. For instance, the verification may be performed via short-range wireless connections (e.g. RFID connections) between the wireless transceiver 232 and the items. As discussed above, the various items may be provided with one or more wireless transceivers in communication with the computing platform 150. Additionally or alternatively, the computing platform 150 may detect the presence of a power device connected to the power outlet of the vehicle 112. Additionally or alternatively, the computing platform 150 may detect the items further using the weight sensor 148.

If the computing platform 150 detects presence of an undesired item and/or an absence of a desired item, the process proceeds from operation 306 to operation 308 and the computing platform 150 outputs a message via the HMI controls and/or the mobile device 228 to provide the recommendation of desired/undesired items to the user. At operation 310, the computing platform 150 determines a total amount of energy and a driving range at the end of the trip as planned. As discussed above, the trip information may include one or more destination locations and the computing platform 150 may calculate the energy required for the vehicle 112 to arrive at the locations. The computing platform 150 may more accurately calculate the energy consumed during the driving using the weight of the vehicle anticipated based on the desired items each having a specific weight which affects the power consumption during the driving. In general, an increased weight due to more desired items may result in an increased energy consumption in driving. Additionally, the trip information may further include a duration of the trip having a planned departure time at the end of the trip at each destination location. The computing platform 150 may predict an energy usage throughout the duration including power consumed by appliances (e.g. cooktop, refrigerator or the like), lighting, HVAC, and power supplied to the one or more external power devices 282. In case that other sources of fuel other than electricity are provided to the vehicle 112 (e.g. gasoline, diesel, propane), the computing platform 150 may further take those alternative energy source into account. In case that the electricity generating devices (e.g. solar panel) are available, the computing platform 150 may further predict an amount of generated energy during the trip until the departure time to strengthen the total energy calculation. With the total amount of energy predicted, the computing platform 150 may determine the driving range at the departure time end of the trip.

At operation 312, the computing platform 150 determines the location of one or more vehicle fueling locations near the predicted location at the end of the trip. The fueling locations may include one or more public fueling stations supplying the type of energy compatible with the vehicle 112 (e.g. a charging station). Additionally, the fueling locations may include one or more private vehicle chargers (e.g. home charger) that are available to the vehicle. At operation 314, the computing platform 150 verifies if the vehicle 112 has a sufficient range to arrive at one or more of the fueling locations. The computing platform 150 may directly compare the driving range with the distance to each of the fueling locations to make the determination. Additionally, a margin (e.g. extra 10% range, 10 miles, or the like) may be added to the driving range the provide a more robust evaluation. If the computing platform 150 determines the driving range is insufficient for the vehicle 112 to reach the one or more fueling stations, the process proceeds from operation 314 to operation 316, and the computing platform 150 outputs recommendations to the user and disables one or more power outlets 133 and/or vehicle features in the form of the low-voltage load 131 and/or electric load 132. The computing platform 150 may calculate an increased driving range by disabling certain items or features of the vehicle 112 and provide the recommendation based on the calculation. For instance, if the vehicle 112 has insufficient driving range to reach the fueling location under the current prediction, but would have sufficient driving range if the user refrains from using the electric stove to cook a meal, the vehicle 112 may provide the recommendation to ask the user to skip the cooking to save energy. If the user accepts the recommendation by making an input, the computing platform 150 may record the input and disable the stove (e.g. the associated power outlet) during a predicted cook time to fulfill the energy saving target. Additionally, the computing platform 150 may automatically disable certain preset features to conserve energy. As discussed above, the plurality of power outlets 133 may be individually controlled on and off. The computing platform 150 may be configured to automatically disable or limit one or more power outlets associated with one or more features that are non-essential to the vehicle operation (e.g. entertainment features). Additionally, the vehicle 112 may be further configured to limit one or more vehicle driving operations. For instance, one or more ECUs 268 of the vehicle 112 may limit the speed of the vehicle, or prevent the vehicle 112 from driving in the performance mode to conserve energy. The operations performed at operation 316 may be performed at any time with regard to the trip. For example, the computing platform 150 may switch off the power outlet or limit vehicle operations when the vehicle 112 is driving to the destination locations, during stay at the trip locations, and/or driving from the destination locations to the fueling locations after the departure time.

To further conserve energy, the user and the vehicle 112 may travel separately and meet up at a predefined location. The vehicle 112 may be operated automatously via an autonomous driving controller (not shown) and drive to the location of the user. For instance, in the hiking trip, the user may prefer to walk to a location away from the vehicle parking location. In this case, instead of walking back to the parking location, the user may send his/her current location to the vehicle 112 via the mobile device 228. The current location may be the location of the mobile device 228 in one example. Responsive to receiving the user location, the process proceeds from operation 318 to operation 320 and the vehicle 112 autonomously drives to the user location to pick the user up. Since, the vehicle 112 operates in the driverless mode, one or more vehicle features such as display and audio may be disabled to conserve energy. The absence of the user's weight further conserves energy.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. The words processor and processors may be interchanged herein, as may the words controller and controllers.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
an electric motor configured to propel the vehicle;
a battery configured to provide power to the electric motor;
one or more power outlets configured to receive one or more plugs; and
one or more controllers programmed to, while the vehicle is travelling toward a destination and when a driving range is less than a value that is defined by a distance from the destination to a charging station, disable one of the power outlets.

2. The vehicle of claim 1, wherein the one or more controllers are further programmed to, when the driving range is greater than the value, enable the one of the power outlets.

3. The vehicle of claim 1, wherein the one or more controllers are further programmed, to responsive to receiving trip information including terrain information of a destination, determine an item undesired for the destination based on the terrain information, and responsive to detecting a presence of the item via a wireless connection, output a recommendation to remove the item from the vehicle to increase the driving range.

4. The vehicle of claim 1, wherein the one or more power outlets are further configured to receive power from a generating device, and wherein the driving range is determined using an amount of power output by the generating device as predicted using weather information at a destination.

5. The vehicle of claim 1, wherein the one or more controllers are further programmed to generate commands to autonomously drive the vehicle from a destination to a meetup location to pick up a vehicle user, and limit power to a vehicle feature during driving from the destination to the meetup location.

6. The vehicle of claim 5, wherein the meetup location is received from a mobile device associated with the vehicle user.

* * * * *